Patented Apr. 27, 1954

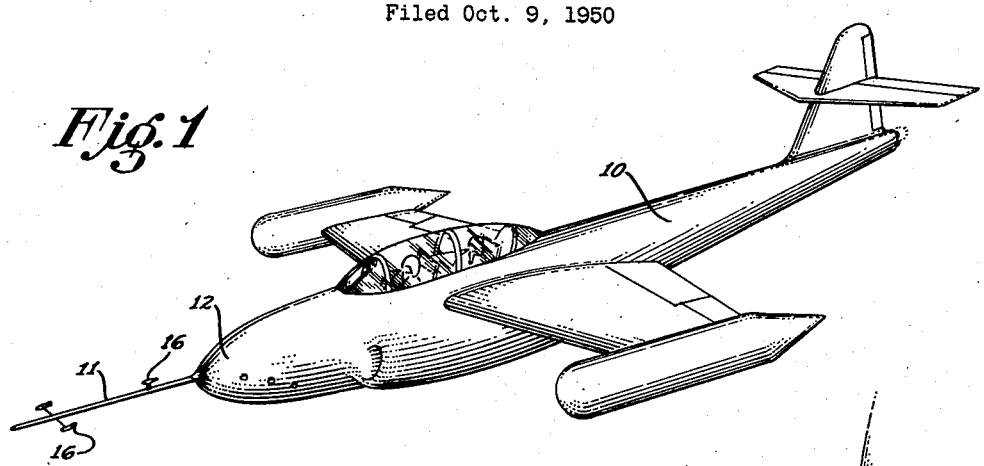
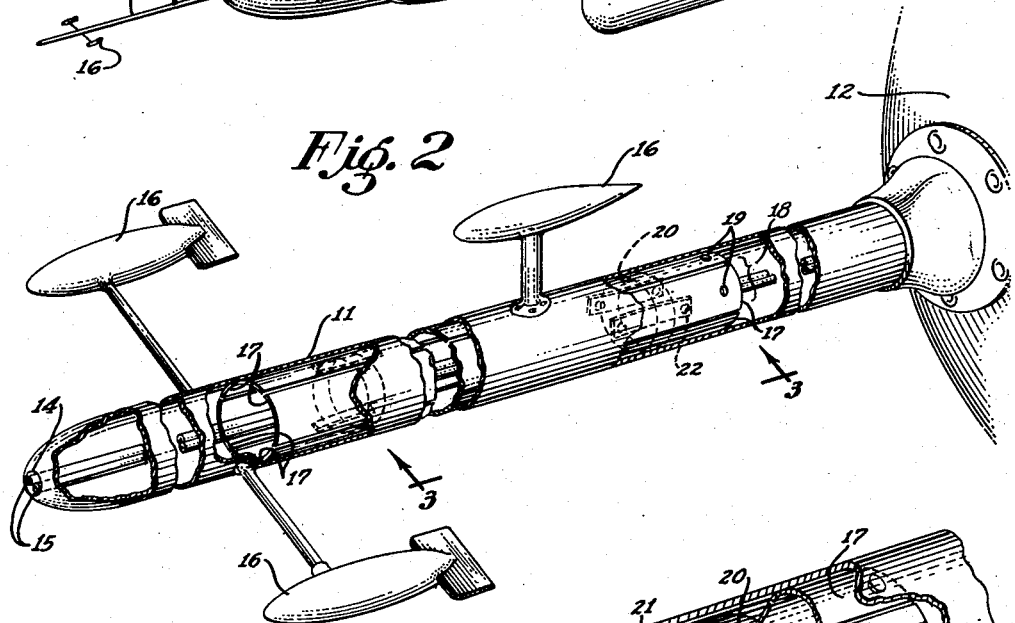
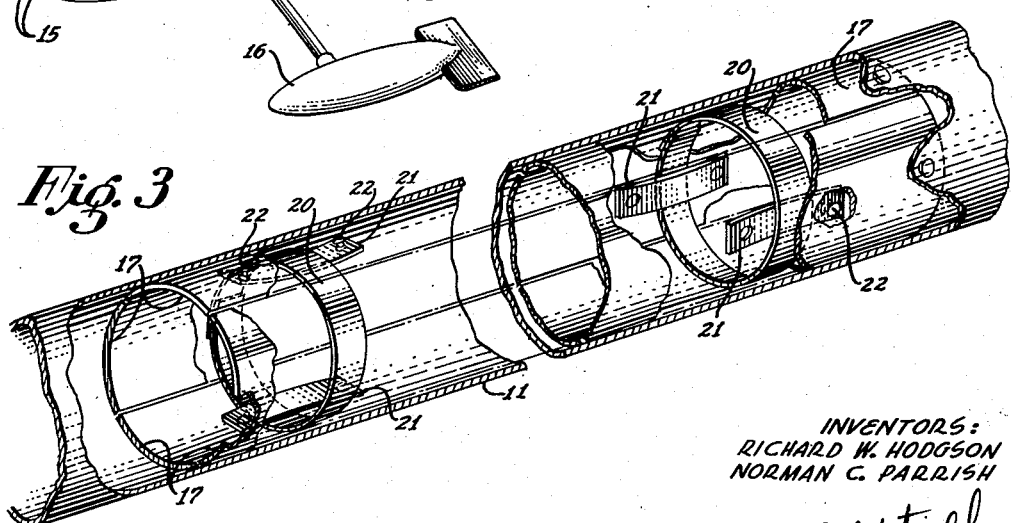

2,676,674

UNITED STATES PATENT OFFICE 2,676,674

BOOM FRICTIONAL DAMPER

Richard W. Hodgson, Compton, and Norman C. Parrish, Redondo Beach, Calif., assignors to Northrop Aircraft, Inc., Hawthorne, Calif., a corporation of California Application October 9, 1950, Serial No. 189,096

2 Claims. (Cl. 188—1)

Our invention relates to the dampening of vibration and more specifically to a vibration damper ideally suited for use in connection with instrumentation booms or masts of tubular construction as used on aircraft.

With the advent of high speed jet propelled aircraft, it has been found that accurate airflow instrumentation data often cannot be obtained from instrumentation devices located close to the structure of the aircraft. Consequently, pitot tubes and other instrumentation devices for obtaining instrumentation data are placed in or mounted on the ends of booms or masts of tubular construction, ranging in length up to 12 feet or longer, attached to and projecting forwardly of the aircraft.

While existing booms are amply strong and satisfactory under most conditions, it has been found that at certain high speeds, extremely high radial vibrations can be set up in such booms. The vibrations often become so severe as to threaten damage to the boom and the supported instruments, if allowed to continue for any substantial length of time.

The object of our invention is to provide a simple and efficient vibration damper suitable for use in conjunction with instrumentation booms or masts of tubular construction which are fastened to support at one end only and subject to severe radial vibration when in use.

It is another object of our invention to provide a simple and efficient mast vibration damper of low weight which will add a minimum of drag to the airplane.

It is another object of our invention to provide a simple and efficient vibration damper which is wholly internally contained in an instrumentation boom of tubular construction.

It is another object of our invention to provide a simple and efficient vibration damper suitable for use in aircraft instrumentation booms or masts of tubular construction, whereby the installation of tubing or other apparatus for obtaining instrumentation data will not be restricted.

As applied to instrumentation booms or masts of tubular construction, our invention may take the form of a plurality of longitudinal cylindrically contoured friction strips evenly spaced around the internal periphery of the boom or mast, and shaped to conform to the inside surface of the boom. These friction strips are fastened or affixed rearwardly at their base to the wall of the boom.

A plurality of split narrow spring collars, preformed to a larger circumference than the instrumentation boom, are sprung into place inside the strips to exert an outward force thereon. The collars are held in place against the inner peripheries of the evenly spaced friction strips by narrow strips of material transversely fastened to the friction strips. A number of said collar springs are spaced along the friction strips and exert an outwardly directed pressure against the friction strips, thereby creating friction between said friction strips and the inner wall of the hollow boom. The friction developed between the friction strips and the boom efficiently damps out radial boom vibration.

Our invention will be more clearly understood by referring to the drawings, in which:

Figure 1 is a perspective view of the Northrop F-89 Air Force jet propelled airplane 10 showing a typical installation of an instrumentation boom.

Figure 2 is a perspective diagrammatic cutaway view of the instrumentation boom 11 shown in Figure 1.

Figure 3 shows a diagrammatic perspective view of collar springs with transverse strips holding the springs in place.

Referring first to Figure 1, a high speed jet propelled aircraft 10 is equipped with a forwardly projecting instrumentation boom 11 of tubular construction firmly mounted and fastened to supporting structure (not shown) in the nose 12 of the airplane. In this example the boom 11 is 12 feet long, has an outside diameter of 3 inches, a wall thickness of .109 inch, and tapers about 3 inches from its forward end to an orifice 14 having a diameter of about ¾ inch.

Referring to Figure 2, the boom 11 contains a number of tubes 15 connected to orifice 14 for the purpose of transmitting pressure data to related devices (not shown) in the airplane. A plurality of other instrumentation devices 16 are mounted on the external periphery of the boom 11 for measuring force, for example, yaw and pitch, and transmitting the data to related devices (not shown) inside the airplane for recording and interpretation. The tubes 15 for measuring pressure are firmly held in place and sealed so that air pressure is admitted into the open ends of the pressure tubes 15 only through orifice 14.

Instrumentation booms, such as have been described, are generally satisfactory at comparatively low speeds of flight, but at the high speeds of flight attained by many present jet propelled aircraft, the booms may develop extremely high vibrations which may cause damage.

To damp vibration, we provide four longitudinal friction strips 17 of a material having low elastic properties, and space them evenly around the internal periphery of instrumentation boom 11, as shown in Figure 2. Each friction strip 17 is fastened at its base by means of mounting screws 19 at a point approximately 4 feet from the base of the boom 11, for example, and the strips 17 extend forwardly for approximately 7 feet 6 inches; a length found expedient in the particular boom described.

Referring to Figure 3, a number of collar springs 20 coaxially positioned inside of the boom 11 provide the inner support for the friction strips 17 and are securely held in place transversely by straps 21 of material fastened at each end to a strip 17 by rivets 22, for example. These collar springs 20 which are annularly formed strips of spring steel with their ends overlapping, have a normal diameter greater than the diameter of the boom and are preferably connected by the straps 21 to opposite strips 17, alternately as shown in Figure 2. Collar springs 20 are evenly spaced along the friction strips 17 so as to exert an outward force from one extremity of the friction strips 17 to the other. Collar springs 20 can be loaded to exert any degree of radial force desired, in this example 7.88 pounds each. The spring load will, of course, vary with the friction value required by the vibration factors involved. The main consideration is to provide the maximum frictional force that will allow relative motion between the boom 11 and the friction strips 17 and will not be so great as to allow the friction strips 17 and the boom 11 to vibrate as a single unit above some stipulated minimum vibration amplitude.

Inasmuch as our vibration damper is fastened to the boom 11 at one point 18, the removal of the vibration damper may be easily effected by removal of the boom from the aircraft and the subsequent removal of each of the mounting screws 19 at the basal end of the vibration damper.

It can be concluded, referring to Figure 2, that the friction strips 17 cover sufficient surface to effectively dampen vibration from any radial direction, passing through the axis of the boom 11 and thereby prevent the increase of such vibrations to destructive amplitudes.

It has been established by actual test of a specific example of our invention that, as compared to conventional and prior known vibration damping devices, the damping decrement period was decreased from 78.6 seconds to 2.4 seconds for the time of decrease from maximum vibration amplitude to minimum vibration amplitude. It was further found that the example of our invention damped vibration amplitude to 5% of the original amplitude by the 4th cycle of the free vibration period.

It will be noted that the particular embodiment of our invention described, is confined to the interior walls of the boom, leaving the greater portion of the interior of the boom unencumbered so that the installation of tubes and wires is materially unrestricted.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A vibration damper comprising a hollow tubular member supported at one end only thereof and subject to vibration, a plurality of resilient longitudinal friction strips mounted in the interior of said tubular member and extending along the length thereof adjacent the interior periphery of said tubular member, said strips having substantially the same radius of curvature as the radius of curvature of the inner surface of said tubular member, each of said strips being attached at one end only to said tubular member adjacent the supported end thereof, a plurality of split ring springs formed to a greater diameter than the inner diameter of said tubular member, said springs being sprung inwardly with the ends thereof overlapping, said springs being coaxially positioned inwardly of said friction strips and spaced along the extent thereof to define inner supports therefor, said springs being preloaded to bear radially outwardly with sufficient force to maintain substantially the entire outer surface of said friction strips in proper frictional contact with the interior periphery of said tubular member, and means attached only to said friction strips to restrict coaxial travel of said springs along the extent of said friction strips to a prespecified distance.

2. A vibration damper comprising a hollow tubular member supported at one end only thereof and subject to vibration, a plurality of resilient longitudinal friction strips mounted in the interior of said tubular member and extending along the length thereof adjacent the inner periphery of said tubular member, said strips having substantially the same radius of curvature as the radius of curvature of the interior periphery of said tubular member, each of said strips being attached at one end only to said tubular member adjacent the supported end thereof, a plurality of split ring springs formed to a larger normal diameter than the inner diameter of said tubular member, said springs being sprung inwardly with the ends thereof overlapping and coaxially positioned inwardly of said friction strips in spaced relation to each other along the extent of said friction strips to define inner supports therefore, said springs being preloaded to exert a predetermined force radially outwardly to maintain substantially the entire outer surfaces said friction strips in proper frictional contact with the interior periphery of said tubular member, and an attachment strip for each of said annular springs, said attachment strips extending parallel of said friction strips and being attached at each end thereof to said friction strips with said split ring springs interposed therebetween to limit the amount of coaxial travel of said springs to a prespecified distance as determined by the distance between the fastened ends of said attachment strips.

References Cited in the file of this patent

UNITED STATES PATENTS

| Number | Name | Date |
| --- | --- | --- |
| 1,616,176 | Bremer | Feb. 1, 1927 |
| 1,940,449 | Dodge | Dec. 19, 1933 |
| 2,151,280 | Rouy | Mar. 21, 1939 |
| 2,221,547 | Kollsman | Nov. 12, 1940 |
| 2,494,985 | Campbell | Jan. 17, 1950 |
| 2,513,390 | Young | July 4, 1950 |
| 2,534,963 | Fowler | Dec. 19, 1950 |
| 2,538,003 | Jennings | Jan. 16, 1951 |
| 2,582,397 | Schwartz et al. | Jan. 15, 1952 |